(12) United States Patent
Takagi et al.

(10) Patent No.: US 9,862,095 B2
(45) Date of Patent: Jan. 9, 2018

(54) CONTROL DEVICE FOR MOBILE ROBOT (71) Applicant: HONDA MOTOR CO., LTD., Tokyo (JP)

(72) Inventors: Yutaka Takagi, Saitama (JP); Chiaki Tanaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 175 days.

(21) Appl. No.: 14/802,344

(22) Filed: Jul. 17, 2015

(65) Prior Publication Data

US 2016/0082591 A1 Mar. 24, 2016

(30) Foreign Application Priority Data

Sep. 24, 2014 (JP) ................................. 2014-193610

(51) Int. Cl.
| | | |
|---|---|---|
| *G05B 19/04* | (2006.01) | |
| *G05B 19/18* | (2006.01) | |
| *B25J 9/16* | (2006.01) | |
| *B62D 57/032* | (2006.01) | |
| *G05B 19/4063* | (2006.01) | |

(52) U.S. Cl.
CPC .......... *B25J 9/1674* (2013.01); *B62D 57/032* (2013.01); *G05B 19/4063* (2013.01); *G05B 2219/42281* (2013.01); *G05B 2219/42282* (2013.01); *G05B 2219/42289* (2013.01); *Y10S 901/01* (2013.01)

(58) Field of Classification Search
CPC ..... B25J 9/1674; B25J 9/10; B25J 5/00; B25J 9/16; B25J 9/1669; B62D 57/032; G05B 19/4063; G05B 2219/42289; G05B 2219/42282; G05B 2219/42281; Y10S 901/01; A63H 11/18
See application file for complete search history.

(56) References Cited

U.S. PATENT DOCUMENTS

| | | | | |
|---|---|---|---|---|
| 6,998,809 | B2 * | 2/2006 | Iribe | B25J 9/1633 318/568.12 |
| 7,023,164 | B2 * | 4/2006 | Iribe | B25J 9/1674 318/563 |
| 9,205,560 | B1 * | 12/2015 | Edsinger | B25J 9/1674 |
| 9,475,191 | B1 * | 10/2016 | Urata | B62D 57/022 |
| 9,561,829 | B1 * | 2/2017 | Urata | B62D 57/032 |
| 2004/0169484 | A1 * | 9/2004 | Iribe | B25J 9/1633 318/568.11 |

(Continued)

FOREIGN PATENT DOCUMENTS

| | | |
|---|---|---|
| JP | 3813102 | 6/2006 |
| JP | 2006-272470 | 10/2006 |

*Primary Examiner* — Nicholas Kiswanto
*Assistant Examiner* — Rachid Bendidi
(74) *Attorney, Agent, or Firm* — Rankin, Hill & Clark LLP (57) ABSTRACT

The present invention provides a control device for a mobile robot. While a mobile robot 1 is in a predetermined motion state, if a load evaluation amount, which is either the magnitude of a load detected on a particular joint or an estimated temperature value of a joint actuator for driving the joint, exceeds a predetermined threshold value, then a desired displacement amount of each joint of the mobile robot 1 is determined with a requirement that the load evaluation amount remains to be the threshold value or less, and the joint actuator is controlled on the basis of the determined desired displacement amount.

6 Claims, 6 Drawing Sheets

(56) References Cited

U.S. PATENT DOCUMENTS

| | | | |
|---|---|---|---|
| 2004/0172165 A1* | 9/2004 | Iribe | B62D 57/032 700/245 |
| 2004/0176875 A1* | 9/2004 | Iribe | G06N 3/008 700/245 |
| 2005/0179416 A1* | 8/2005 | Iribe | B25J 9/1674 318/563 |
| 2005/0184697 A1* | 8/2005 | Iribe | B25J 9/1633 318/568.12 |
| 2006/0214621 A1* | 9/2006 | Ogawa | B25J 9/1674 318/568.12 |
| 2015/0343633 A1* | 12/2015 | Gouaillier | G05B 13/04 700/261 |

* cited by examiner

CONTROL DEVICE FOR MOBILE ROBOT

BACKGROUND OF THE INVENTION

Field of the Invention

The present invention relates to a control device for a mobile robot, such as a legged mobile robot.

Description of the Related Art

Hitherto, there has generally been known a mobile robot provided with movable links (leg links, arm links and the like) connected to a base body through the intermediary of joints, such as a legged mobile robot described in Japanese Patent No. 3813102 (hereinafter referred to as "Patent Document 1").

In this type of mobile robot, the displacement amount of each joint is usually controlled through the intermediary of a joint actuator, which is constituted of an electric motor or the like, according to a motion command prepared to enable the mobile robot to perform a desired motion in an expected environment.

When operating a mobile robot in a variety of environments, especially in a state in which the motion of the mobile robot has been brought to a halt (e.g. a standby mode for waiting for a motion instruction), a situation in which a load on a particular joint of the mobile robot remains steadily high tends to occur.

For example, in a motion halt mode of a mobile robot engaged in work on an irregular ground, if the shape of the ground surface area with which a leg link of the mobile robot is in contact is disturbed from the original shape thereof or the shape of the ground surface area is unexpected, then the entire attitude of the mobile robot inconveniently deviates steadily from an initially expected attitude. This causes the load on a particular joint to remain steadily high in some cases.

If the situation in which the load on any particular joint of the mobile robot undesirably remains steadily high takes place, then the amount of energy consumed by the joint actuator for driving that particular joint cumulatively increases and the temperature of the joint actuator excessively increases, possibly leading to deteriorated performance of the joint actuator or damage thereto. This may prevent normal motion control of the mobile robot.

SUMMARY OF THE INVENTION

The present invention has been made in view of the background described above, and an object of the invention is to provide a control device for a mobile robot that is capable of preventing the temperature of a joint actuator for driving a particular joint of a mobile robot from becoming high due to an excessive load continuously applied to the particular joint.

To this end, a control device for a mobile robot in accordance with the present invention is a control device for a mobile robot provided with a base body, a plurality of joints, a movable link connected to the base body such that the movable link moves with respect to the base body by a motion of one or more joints among the plurality of the joints, and joint actuators that drive the joints, the control device including:

a joint load detecting unit that detects a load on each joint of the mobile robot; and a joint control unit which determines a desired displacement amount of each joint of the mobile robot that satisfies a requirement that a load evaluation amount remains to be a predetermined threshold value or less in the case where the load evaluation amount, which is either the magnitude of a load detected on a particular joint of the mobile robot by the joint load detecting unit or an estimated temperature value of the joint actuator for driving the joint in a predetermined time obtained based on a detection value of the load, exceeds a predetermined threshold value in a predetermined motion state of the mobile robot, and which controls the joint actuator for driving each joint of the mobile robot based on the desired displacement amount (a first aspect of the invention).

The term "load" on each joint in the present invention means a force (a translational force or a torque) or the amount of energy (e.g. electric power) required for driving the joint.

According to the first aspect of the invention, if the load evaluation amount exceeds a predetermined threshold value, then the joint control unit determines the desired displacement amount of each joint of the mobile robot which makes it possible to satisfy the requirement that the load evaluation amount remains to be the predetermined threshold value or less. Further, the joint control unit controls the joint actuator for driving each joint of the mobile robot based on the desired displacement amount.

This arrangement makes it possible to prevent the occurrence of a situation in which the load evaluation amount on a particular joint is steadily maintained to exceed the predetermined threshold value. As a result, an excessive increase in the temperature of the joint actuator can be prevented.

Thus, the first aspect of the invention makes it possible to prevent an excessive load from being continuously applied to any particular joint of the mobile robot. This consequently makes it possible to prevent the temperature of the actuator for driving the joint from becoming high.

The first aspect of the invention described above is ideally suited to a case where the predetermined motion state is a state in which the motion of at least a contact movable link, which is a movable link brought into contact with an external object so as to be subjected to a contact reaction force against a gravitational force acting on the mobile robot, among the movable links is at a halt (a second aspect of the invention).

More specifically, the contact reaction force acting on each contact movable link is substantially constant in the state in which the motion of at least the contact movable link, which is a movable link brought into contact with an external object to be subjected to a contact reaction force against the gravitational force acting on the mobile robot, among the movable links is at a halt. Therefore, depending on the attitude of the mobile robot, a situation tends to occur, in which the load evaluation amount on a particular joint of the contact movable link is likely to steadily exceed the predetermined threshold value.

Thus, the situation in which the load on the joint steadily remains excessive can be effectively prevented by carrying out the control of the joint actuator (the control in the case where the load evaluation amount exceeds the predetermined threshold value) by the joint control unit in foregoing motion state.

In the second aspect of the invention, the joint control unit is preferably configured to determine, as a desired displacement amount of each joint of the mobile robot, a desired displacement amount which can be attained while holding the contact movable link in contact with the external object and which makes it possible to satisfy the requirement in the state in which the motion of the contact movable link is at a halt at the desired displacement amount, and to control the joint actuator for driving each joint so as to change an actual displacement amount of each joint of the mobile robot to the determined desired displacement amount (a third aspect of the invention).

According to the third aspect of the invention, the desired displacement amount of each joint determined by the joint control unit is a desired displacement amount that can be attained while holding the contact movable link in contact with the external object and also a desired displacement amount that allows the requirement to be satisfied in the state in which the motion of the contact movable link is at a halt at the desired displacement amount. Therefore, by changing the actual displacement amount of each joint to the desired displacement amount and by bringing the motion of the contact movable link to a halt eventually at the desired displacement amount, it becomes possible to change the attitude of the mobile robot to the attitude at which the requirement can be steadily satisfied while holding the contact movable link in contact with the external object.

Thus, even if the topographical or geological condition of the vicinity of the mobile robot in the predetermined motion is unknown or uncertain, the attitude of the mobile robot can be smoothly changed to a state that steadily satisfies the requirement (a state defined by the desired displacement amount).

Further, in the first to the third aspects of the invention, the joint control unit is preferably configured to determine the desired displacement amount of each joint of the mobile robot which makes it possible to satisfy the requirement under a constraint condition related to the position of a contact portion to be brought in contact with an external object during the predetermined motion state among individual portions of the mobile robot, a contact reaction force acting on the contact portion, and the position of the center of gravity of the mobile robot (a fourth aspect of the invention).

According to the fourth aspect of the invention, an appropriate desired displacement amount that makes it possible to secure the stability of the attitude of the mobile robot while satisfying the requirement by adding the constraint conditions related to the position of the contact portion, the contact reaction force acting on the contact portion, and the position of the center of gravity of the mobile robot.

In the fourth aspect of the invention, preferably, the constraint condition related to the position of the contact portion is a constraint condition for restricting the desired position of the contact portion to an actual position of the contact portion, the constraint condition related to the contact reaction force is a constraint condition that limits the moment acting on the mobile robot due to the contact reaction force, and the constraint condition related to the position of the center of gravity is a constraint condition for restricting a positional relationship between the position of the center of gravity and the contact portion (a fifth aspect of the invention).

According to the fifth aspect of the invention, the desired displacement amount of each joint can be determined on the basis of the actual position of the contact portion such that the stability of the attitude of the mobile robot can be secured.

Further, in the first to the fifth aspects of the invention, the joint control unit is preferably configured to control the joint actuator for driving each joint such that, in the case where the actual displacement amount of each joint of the mobile robot is changed to the determined desired displacement amount, the magnitude of a temporal change rate of the displacement amount of each joint in a period immediately after a start of the transition and a period immediately before an end thereof is smaller than that in a period between the period immediately after the start of the transition and the period immediately before the end thereof (a sixth aspect of the invention).

With this arrangement, the acceleration of a change in the displacement amount of each joint can be continuously changed. This allows the transition of the displacement amount of each joint to be smoothly accomplished with high stability.

In the present invention, the processing of determining the desired displacement amount of each joint that satisfies the requirement may adopt, for example, a technique for exploratorily determining the desired displacement amount of each joint that satisfies the requirement (a technique for determining an appropriate desired displacement amount of each joint by repeating the processing of provisionally setting the value of the desired displacement amount, the processing of evaluating the validity of the provisionally set value, and the processing of updating the provisionally set value of the value of the desired displacement amount according to the result of the evaluation).

DESCRIPTION OF THE PREFERRED EMBODIMENTS

An embodiment of the present invention will be described below with reference to FIG. 1 to FIG. 7.

Figure 1:
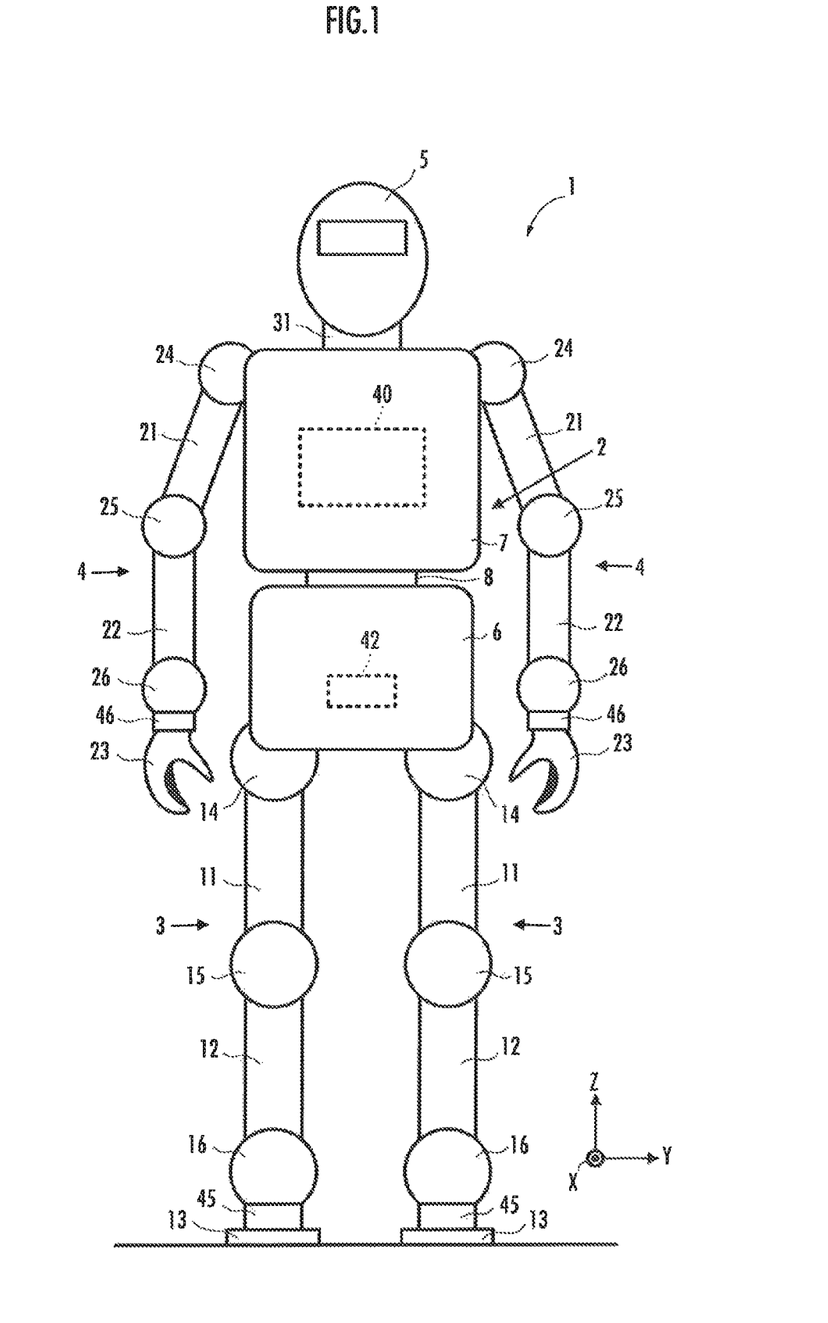
FIG. 1 is a diagram illustrating the schematic constitution of a mobile robot according to an embodiment of the present invention.

Referring to FIG. 1, a mobile robot 1 of the present embodiment is an exemplary humanoid robot. The mobile robot 1 (hereinafter referred to simply as "the robot 1" in some cases") has a base body 2 corresponding to a body, a pair of left and right (two) leg links 3, 3 serving as a plurality of movable links connected to the base body 2, a pair of left and right (two) arm links 4, 4, and a head 5.

The base body 2 is constructed of a lower base body 6 constituting the lower part thereof, an upper base body 7 constituting the upper part thereof, and a joint mechanism section 8 connecting the lower base body 6 and the upper base body 7. The joint mechanism section 8 is composed of, for example, two joints (not illustrated) so as to have a degree of freedom of rotation about a total of two axes, namely, a yaw axis and a pitch axis.

In the description of the present embodiment, a "joint" will mean a joint that has the degree of freedom of rotation about one axis, unless otherwise specified. The joint may adopt a publicly known structure having two members that are relatively rotatable about one axis.

Further, in the description of the present embodiment, the yaw axis, the pitch axis, and a roll axis will mean the axis in the vertical direction (Z-axis) of the robot 1, the axis in the lateral direction (Y-axis) thereof, and the axis in the longitudinal direction (X-axis) thereof, respectively, in the state in which the robot 1 is standing, as illustrated in FIG. 1.

Each of the leg links 3 is extended from the lower base body 6 of the base body 2. Each of the leg links 3 is constituted of element links corresponding to a thigh 11, a crus 12, and a foot 13, which are connected in this order from the base body 2 side through the intermediary of a hip joint mechanism section 14, a knee joint mechanism section 15, and an ankle joint mechanism section 16.

Further, in the present embodiment, the joint mechanism sections 14, 15 and 16 between the foot 13, which is the distal end portion of each of the leg links 3, and the base body 2 are configured such that the foot 13 of the leg link 3 moves with, for example, six degrees of motional freedom with respective to the base body 2.

For example, the hip joint mechanism section 14 is constructed of three joints (not illustrated) so as to have the degree of freedom of rotation about a total of three axes, namely, the yaw axis, the pitch axis and the roll axis. The knee joint mechanism section 15 is constructed of a single joint (not illustrated) so as to have the degree of freedom of rotation about, for example, one axis (the pitch axis). The ankle joint mechanism section 16 is constructed of two joints (not illustrated) so as to have the degree of freedom of rotation about, for example, two axes, namely, the pitch axis and the roll axis.

Each of the arm links 4 is extended from the upper base body 7 of the base body 2. Each of the arm links 4 is constituted of element links corresponding to an upper arm 21, a forearm 22, and a hand 23, which are connected in this order from the base body 2 side through the intermediary of a shoulder joint mechanism section 24, an elbow joint mechanism section 25, and a wrist joint mechanism section 26.

Further, in the present embodiment, the joint mechanism sections 24, 25 and 26 between the hand 23, which is the distal end portion of each of the arm links 4, and the base body 2 are configured such that the hand 23 of the arm link 4 moves with, for example, eight degrees of motional freedom with respective to the base body 2.

For example, the shoulder joint mechanism section 24 is constructed of four joints (not illustrated) so as to have the degrees of freedom of rotation about a total of four axes, namely, two yaw axes, the pitch axis and the roll axis. The elbow joint mechanism section 25 is constructed of a single joint (not illustrated) so as to have the degree of freedom of rotation about, for example, one axis (the pitch axis or the roll axis). The wrist joint mechanism section 26 is constructed of three joints (not illustrated) so as to have the degree of freedom of rotation about, for example, a total of three axes, namely, the yaw axis, the pitch axis and the roll axis.

Further, the hand 23 of each of the arm links 4 in the present embodiment is configured to be capable of holding an object. For example, each of the hands 23 is constituted of an appropriate clamping mechanism (e.g. an opening and closing mechanism formed of one-axis joint) or a finger mechanism or the like with a plurality of joints that is capable of performing motions similar to those of human fingers.

The head 5 is attached to the upper end portion of the base body 2 through the intermediary of a neck joint mechanism section 31. The neck joint mechanism section 31 may be constituted of, for example, one, two or three joints so as to have the degree of freedom of rotation about one axis, two axes or three axes.

Supplementarily, each of the leg links 3 may be configured to have a degree of motional freedom that is larger than, for example, six degrees of freedom. Further, each of the arm links 4 may be configured to have, for example, a degree of motional freedom that is smaller than eight degrees of freedom or a degree of motional freedom that is larger than the eight degrees of freedom.

Further, the joint mechanism section 8 of the base body 2 may be configured to have, for example, the degree of freedom of rotation about three axes or the degree of freedom of rotation about one axis. Further, the joints of each of the leg links 3 and the arm links 4 or the base body 2 are not limited to rotary type joints and may include linear motion type joints.

Further, the base body 2 may have a one-piece structure (a structure combining the lower base body 6 and the upper base body 7 into one piece) without the joint mechanism section 8.

Further, the structure of the hands 23 may not include the function for holding an object.

Further, the structure of the robot 1 may not include the head 5 and the neck joint mechanism section 31.

This completes the general description of the mechanical structure of the robot 1 according to the present embodiment.

The description will now be given of the configuration of the motion control of the robot 1.

Figure 2:
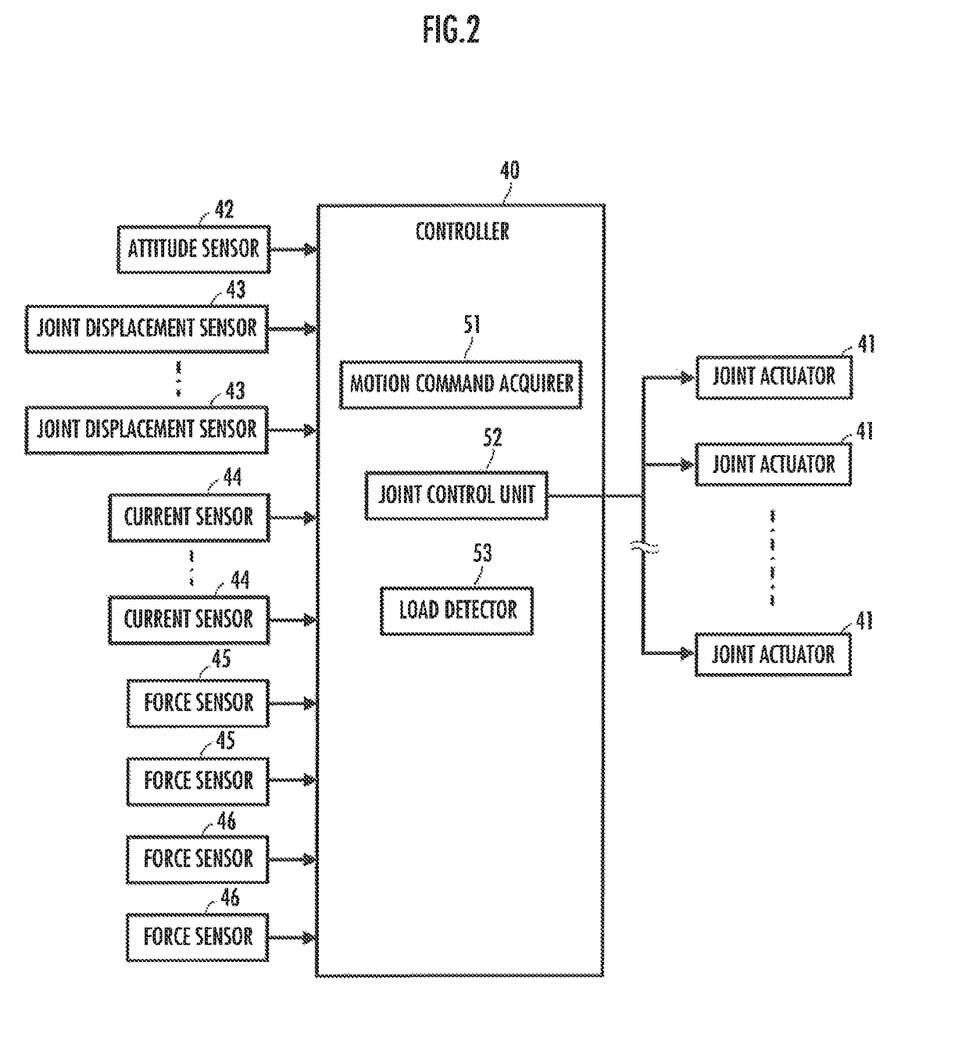
FIG. 2 is a block diagram illustrating the configuration related to the control of the mobile robot according to the embodiment.

As illustrated in FIG. 2, the robot 1 includes a controller 40, which controls the motion of the robot 1, joint actuators 41, which drive the joints, and various necessary sensors.

Each joint is provided with the joint actuator 41. Each of the joint actuators 41 transmits a driving force to its corresponding joint through the intermediary of a reduction gear and the like (not illustrated), thereby driving the joint. The joint actuators 41 in the present embodiment are constituted of electric motors. The joint actuators 41 include the actuators for driving the hands 23.

The sensors installed to the robot 1 include an attitude sensor 42 for detecting the attitude (spatial orientation) of one of the lower base body 6 and the upper base body 7 of the robot 1 (e.g. the attitude of the lower base body 6), joint displacement sensors 43 for detecting the displacement amounts (rotational angles) of the individual joints of the robot 1, current sensors 44 for detecting the energizing currents of the joint actuators (electric motors) 41, force sensors 45 for detecting the external forces (translational forces and moments) applied to the feet 13 of the leg links 3 from an object with which the feet 13 are in contact, and force sensors 46 for detecting external forces (translational forces and moments) applied to the hands 23 of the arm links 4 from an object with which the hands 23 are in contact.

The attitude sensor 42 is a sensor mounted on the lower base body 6 such that the attitude (the spatial orientation) of the lower base body 6 can be detected by, for example, the strapped-down system. In this case, the attitude sensor 42 is comprised of a gyro sensor that detects the angular velocities in three axes and an acceleration sensor that detects the translational accelerations in the three axes.

Each of the joint displacement sensors 43 is provided for each joint. The joint displacement sensor 43 is composed of a rotational angle sensor, such as a rotary encoder or a potentiometer.

Each of the current sensors 44 is provided in an energization path of a coil of the electric motor constituting each of the joint actuators 41.

Each of the force sensors 45 is provided for each of the leg links 3. The force sensor 45 is comprised of, for example, a six-axis force sensor interposed between the ankle joint mechanism section 16 of the leg link 3 and the foot 13 as illustrated in FIG. 1. Further, each of the force sensors 46 is provided for each of the arm links 4. The force sensor 46 is comprised of, for example, a six-axis force sensor interposed between the wrist joint mechanism section 26 of the arm link 4 and the hand 23 as illustrated in FIG. 1.

The robot 1 may be provided with sensors other than those described above. For example, the robot 1 may be provided with a camera serving as a visual sensor of the robot 1 and various sensors for the measurement of external environments.

The controller 40 is comprised of an electronic circuit unit that includes a CPU, a RAM, a ROM, an interface circuit and the like. Further, the detection signals of the foregoing sensors are supplied to the controller 40. The controller 40 may alternatively be comprised of a plurality of electronic circuit units capable of intercommunication.

The controller 40 has, as the functions implemented by executing an installed program or the functions implemented by a hardware configuration, a motion command acquirer 51 that acquires a motion command for the robot 1, a joint control unit 52 that sequentially determines a desired displacement amount (a desired value of a rotational angle) of each joint of the robot 1 according to the motion command or the like and controls the joint actuator 41 such that the actual displacement amount (a detection value provided by the joint displacement sensor 43) follows the desired displacement amount, and a load detector 53 that detects a load on each joint.

The robot 1 in the present embodiment is a robot operated by remote control. A motion command for the robot 1 is transmitted from an external server or the like (not illustrated) to the controller 40. Then, the motion command acquirer 51 acquires the motion command by wireless communication with the server or the like and stores and retains the motion command.

The motion command is composed of, for example, a motion mode of the robot 1, the trajectory of the spatial position and attitude of the foot 13 of each of the leg links 3 of the robot 1, the trajectory of the spatial position and attitude of the hand 23 of each of the arm links 4, the spatial position and attitude of the base body 2 (more specifically, the position and the attitude of the lower base body 6 or the upper base body 7, and the trajectory of the displacement amount of the joint mechanism section 8), and command data instructing the trajectory of the relative attitude of the head 5 with respect to the base body 2 (the upper base body 7).

The trajectory means the time series of instantaneous values.

The joint control unit 52 basically determines the trajectory of a desired displacement amount of each joint of the robot 1 and controls the joint actuator 41 for driving the joint according to the desired displacement amount such that the robot 1 moves according to the motion command acquired by the motion command acquirer 51.

The joint control unit 52 includes the function as the joint control unit in the present invention. In this case, the joint control unit 52 carries out control processing for preventing a load on each joint from remaining to be excessive in a standby mode (a motion pause state of the robot 1) as a predetermined motion state of the robot 1 (hereinafter referred to as "the standby load reduction control processing").

More specifically, the standby mode according to the present embodiment is a state in which the motion of the robot 1 is suspended by bringing one of the leg links 3, 3 and the arm links 4, 4 into contact with an external object, such as a ground surface, so as to be subjected to a contact reaction force against the gravitational force acting on the robot 1 (i.e. so as to support the weight of the robot 1).

The load detector 53 corresponds to the joint load detecting unit in the present invention. In the present embodiment, the joint actuators 41 are composed of electric motors. Hence, the driving force (torque) to be applied to a joint corresponding to the joint actuator 41 thereof is based on the energizing current of the joint actuator 41 (electric motor). According to the present embodiment, therefore, the load detector 53 acquires an output of the current sensor 44 of each of the joint actuators 41 and detects the driving force (torque) of the joint actuator 41 recognized from the output as the load on the joint corresponding to the joint actuator 41.

The description will now be given of the control processing by the controller 40 (especially the control processing related to the present invention).

Figure 3:
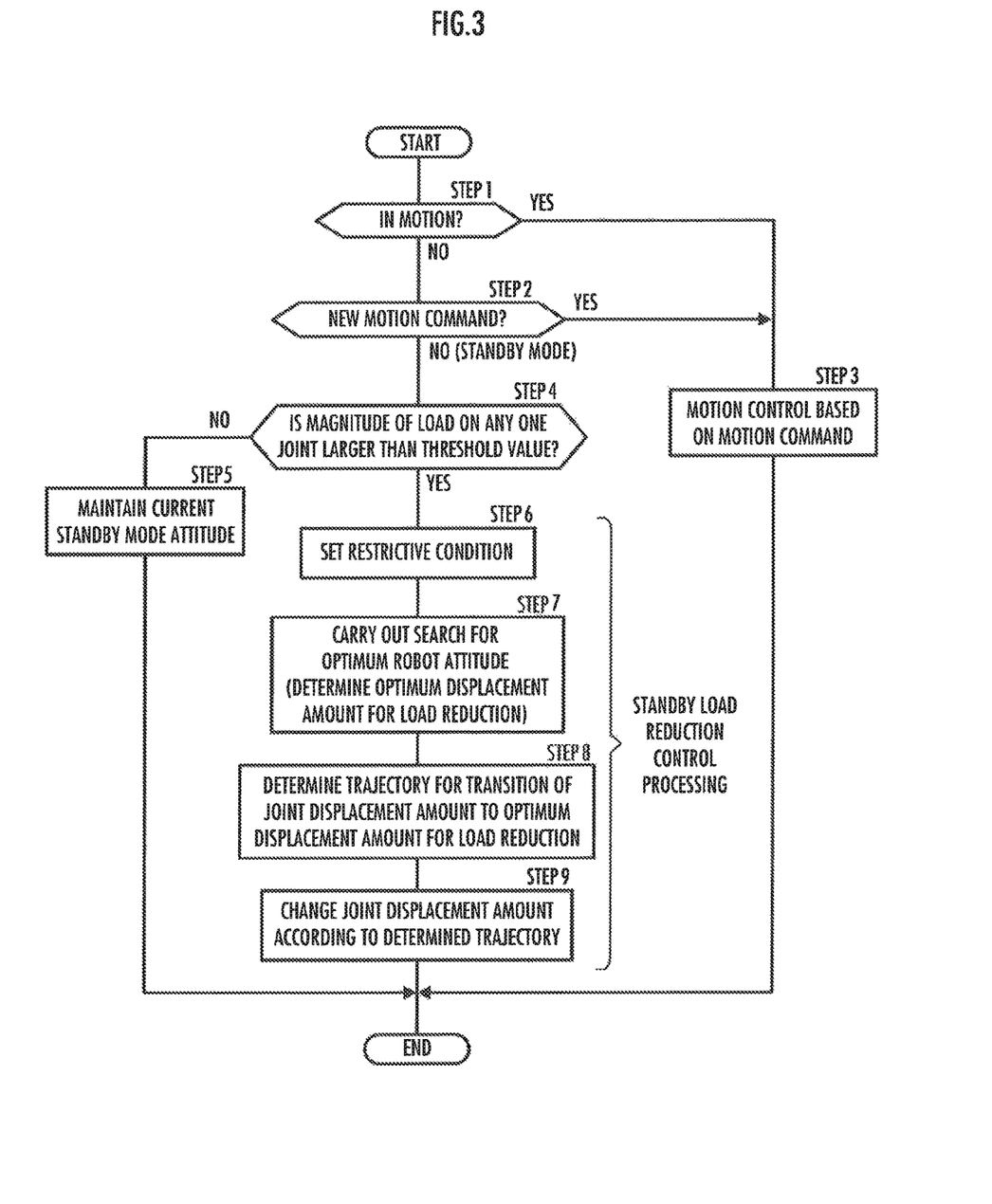
FIG. 3 is a flowchart illustrating the control processing by a control unit illustrated in FIG. 2.

The controller 40 carries out the processing illustrated by the flowchart of FIG. 3.

The controller 40 determines in STEP1 whether the robot 1 is performing a motion based on a motion command. If the determination result in STEP1 is affirmative, then the controller 40 carries out (continues) the motion control of the robot 1 according to the motion command in STEP3.

If the determination result in STEP1 is negative, then the controller 40 further determines in STEP2 whether there is a new motion command to be executed. If the determination result in STEP2 is affirmative, then the controller 40 carries out in STEP3 the motion control of the robot 1 according to the new motion command.

In STEP3, the controller 40 controls, by the joint control unit 52, the joint actuators 41 corresponding to the individual joints of the robot 1 so as to perform the motion (movement) of the robot 1 according to the motion command.

If the determination results in both STEP1 and STEP2 are negative, then it means that the robot 1 is in the standby mode (the robot 1 being in the motion pause state). The standby mode is an attitude state of the robot 1 specified by a motion command when the motion of the robot 1 is terminated or interrupted in response to the motion command. In this standby mode, the displacement amount of each joint of the robot 1 is maintained to be constant or substantially constant.

In this case, the controller 40 further carries out the determination processing of STEP4. In the determination processing, the load detector 53 of the controller 40 detects the load on each of the joints (the driving force (driving torque) of the joint actuator 41 corresponding to each joint) on the basis of an output of the current sensor 44 corresponding to each of the joint actuators 41. Then, the controller 40 determines whether the magnitude (the absolute value) of the detection of the load on a particular joint among the joints of the robot 1 exceeds a predetermined threshold value. According to the present embodiment, the magnitude of the load on each joint is used as the load evaluation amount in the present invention.

The predetermined threshold value is set in advance by experiments or the like to determine the magnitude of a load on a particular joint that may cause the temperature of the coil or the like of the joint actuator 41 (the electric motor) for driving the joint to increase to an excessively high level, resulting in a decreased output of the joint actuator 41 or damage thereto if the state in which the magnitude of the load on the joint exceeds the predetermined threshold value steadily continues.

Supplementarily, the threshold value may be set to a different value, depending on whether the detection value of a load is positive or negative. Further, if the performances or the specifications of the joint actuators 41 differ according to which portions the joints to be driven belong to, then the threshold value may be set for each performance or specification of the joint actuators 41.

Depending on, for example, the condition of the external environment of the robot 1 or the situation at the start of the standby mode, there are cases where the magnitude of the load on a particular joint exceeds the threshold value while the robot 1 is in the standby mode.

For example, if the motion (including a travel) of the robot 1 based on a motion command is carried out on an irregular ground or the like, then the shape of the ground at a spot with which the robot 1 in the standby mode is in contact may be disturbed due to the crumbling of the spot or the like, causing the shape of the ground spot to have a low degree of agreement with the one expected in the motion command. In such a situation, the entire attitude of the robot 1 in the standby mode would deviate from the attitude originally planned in the motion command, so that the magnitude of the load on a particular joint might exceed the threshold value.

Figure 6A:
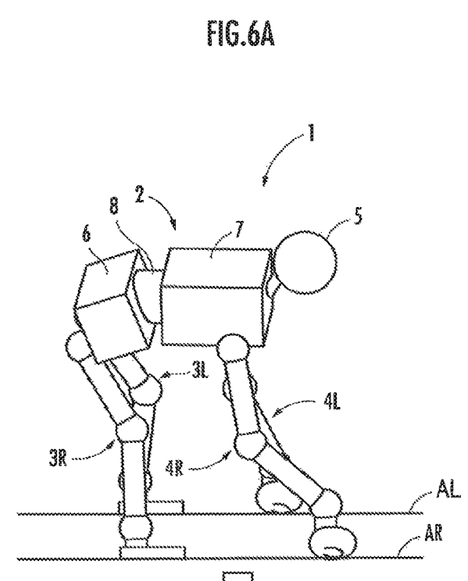
FIG. 6A and FIG. 6B are diagrams illustrating the states of the mobile robot in an exemplary situation in which the determination result in STEP4 in FIG. 3 is affirmative.
Figure 6B:
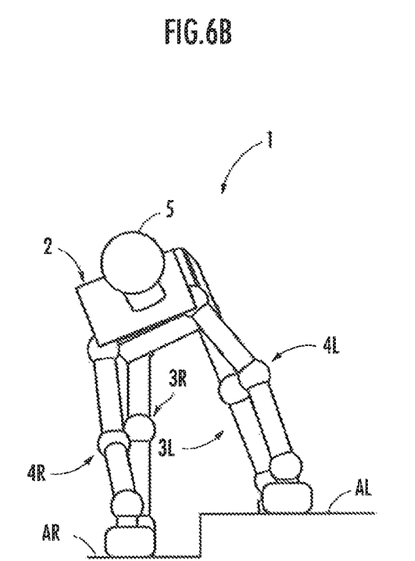

FIG. 6A and FIG. 6B illustrate an example of the foregoing situation. FIG. 6A is a side view of the robot 1 observed from the right side of the robot 1, and FIG. 6B is a front view of the robot 1 observed from the front side.

The standby mode of the robot 1 as illustrated by the example is a state in which the distal end portions of the four movable links, namely, the leg links 3, 3 and the arm links 4, 4 are landed on or brought into contact with the ground surface, which is an external object, so as to be subjected to the contact reaction force against the gravitational force acting on the robot 1.

The example illustrated in FIG. 6A and FIG. 6B indicates the occurrence of an unexpected height difference between a ground surface AL on which the distal end portions of the left leg link 3L and the left arm link 4L of the robot 1 are landed (in contact) and a ground surface AR on which the distal end portions of the right leg link 3R and the right arm link 4R of the robot 1 are landed (in contact). More specifically, the ground surface AL on the left side is higher than the ground surface AR on the right side, causing the base body 2 to be tilted to the right. In this case, the load on either the right leg link 3R or the right arm link 4R tends to become larger. Incidentally, "R" and "L" are reference characters denoting the right side and the left side of the robot 1.

When, for example, the robot 1 is ascending or descending a ladder, a stepladder or the like, if the ascending or descending motion of the robot 1 is immediately interrupted and placed in the standby mode in order to obviate some problem, then the entire attitude of the robot 1 in the standby mode may be such that the gravitational force acting on the robot 1 is mostly supported by the arm links 4, 4 of the robot 1.

Figure 7A:
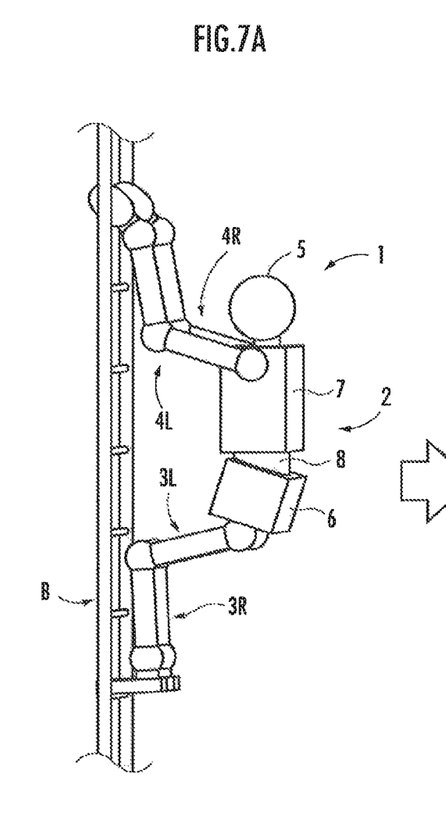
FIG. 7A is a diagram illustrating the state of the mobile robot in another exemplary situation in which the determination result in STEP4 of FIG. 3 is affirmative.

FIG. 7A illustrates an example of the foregoing situation. In the illustrated example, the ascending or descending motion of the robot 1 is interrupted in the middle while the robot 1 is ascending or descending a ladder B, and the robot 1 is placed in the standby mode in the attitude of the interrupted motion. The standby mode is a state in which the motion of the robot 1 is halted by bringing the distal end portions of the four movable links, namely, the leg links 3, 3 and the arm links 4, 4 into contact with or supported by the ladder B, which is an external object, so as to be subjected to a contact reaction force against the gravitational force acting on the robot 1.

In such a case, the load on a particular joint or joints of the arm links 4 of the robot 1 tends to become larger.

Thus, depending on, for example, the condition of the external environment of the robot 1 or the situation at the beginning of the standby mode, the magnitude of the load on a particular joint may undesirably steadily exceed the threshold value during the standby mode of the robot 1.

Supplementarily, the standby mode of the robot 1 illustrated in FIG. 6A and FIG. 6B or FIG. 7A is the state in which the distal end portions of the four movable links, namely, the leg links 3, 3 and the arm links 4, 4 are in contact with the external object. Alternatively, however, the standby mode of the robot 1 may be a state in which only some of the movable links (e.g. only the leg links 3, 3) among the leg links 3, 3 and the arm links 4, 4 may be in contact with the external object. Further, the contact portions to be brought into contact with the external object in the standby mode are not limited to the distal end portions of the leg links 3 (the feet 13) or the distal end portions of the arm links 4 (the hands 23). The contact portions may be other portions of the robot 1, such as a middle portion of the leg link 3 (e.g. the knee) or a middle portion of the arm link 4 (e.g. the elbow).

Referring back to FIG. 3, if the determination result in STEP4 is negative (if the magnitude of the detection value of the load on every joint remains to be the predetermined threshold value or less), then the controller 40 controls the joint actuators 41 by the joint control unit 52 in STEP5 to maintain the current attitude of the robot 1 in the standby mode. In this case, the displacement amount of each joint is maintained to be constant or substantially constant.

If the determination result in either STEP1 or STEP2 is affirmative or the determination result in STEP4 is negative, then the processing from STEP1 is repeated at a predetermined control processing cycle.

Meanwhile, if the determination result in STEP4 is affirmative, then the controller 40 carries out, by the joint control unit 52, the standby load reduction control processing composed of the processing from STEP6 to STEP9.

Specifically, the joint control unit 52 of the controller 40 first sets in STEP6 the restrictive condition related to the motion of the robot 1.

In the present embodiment, the joint control unit 52 sets, for example, the desired position of the center of gravity of the robot 1 (the desired position of the overall center of gravity of the robot 1), the desired positions of the contact portions to be brought into contact with an external object, such as a ground surface, to support the weight of the robot 1, and the desired value of the contact reaction force (the translational force and the torque) acting on each contact portion, as the restrictive conditions.

In this case, the contact portion is a portion set as the portion to be brought into contact with an external object when the robot 1 is placed in the standby mode. Further, the current actual position of each contact portion (the position observed in a global coordinate system fixed to the ground surface or the like in the external environment) is set as the desired position of the contact portion.

For example, in the situation illustrated in FIG. 6A and FIG. 6B or the situation illustrated in FIG. 7A, the distal end portions of the left and right leg links 3L, 3R (the feet 13) and the distal end portions of the left and right arm links 4L, 4R (the hands 23) are the contact portions. The actual positions of the distal end portions of the leg links 3 and the distal end portions of the arm links 4 are set as the desired positions of the contact portions.

In the situation illustrated in FIG. 6A and FIG. 6B or the situation illustrated in FIG. 7A, the left and right leg links 3L, 3R and the left and right arm links 4L, 4R correspond to the contact movable links in the present invention.

In this case, the actual position of each contact portion is estimated from the position and the attitude of a representative portion (e.g. the lower base body 6) of the robot 1 observed in the global coordinate system and the detection value of the displacement amount of each joint based on an output of the joint displacement sensor 43.

Further, the position and the attitude of the representative portion of the robot 1 observed in the global coordinate system can be estimated using, for example, the processing of strap-down calculation (inertial navigation process) based on an output of the attitude sensor 42, the history of the detection value of the displacement amount of each joint, the global positioning system (GPS), a landmark, or the like.

To estimate the actual position of each contact portion, the detection value of the contact reaction force of each contact portion may be used. Further, the arithmetic processing of estimating the actual position of each contact portion may be carried out using a local coordinate system set for an appropriate portion of the robot 1.

The desired position of the center of gravity (the position observed in the global coordinate system) of the restrictive conditions is set such that the contact reaction force against the gravitational force acting on the robot 1 will not be applied heavily to any particular one contact portion. For example, in the situation illustrated in FIG. 6A and FIG. 6B, the desired position of the center of gravity is set such that the desired position of the center of gravity projected onto a horizontal plane (the desired position of the center of gravity in the horizontal direction) will be the position of the center of a support polygon, which is defined by the desired positions of the four contact portions (the distal end portions of the leg links 3, 3 and the distal end portions of the arm links 4, 4), or a position in the vicinity of the center of the support polygon.

Further, in the situation illustrated in, for example, FIG. 7A, the desired position of the center of gravity is set such that the desired position of the center of gravity is closer to right above the distal end portions of the leg links 3, 3 and allows the leg links 3, 3 to stretch more in order to make it easier to generate the contact reaction forces of upward components against the gravitational force at the distal end portions of the leg links 3, 3.

Further, among the restrictive conditions, the desired value of the contact reaction force of each contact portion is set such that, for example, the gravitational force acting on the desired position of the center of gravity and the translational force component of the resultant force of the desired value of the contact reaction force acting on each contact portion are balanced and that the moment generated around the desired position of the center of gravity by the resultant force of the desired value of the contact reaction force acting on each contact portion becomes zero.

Subsequently, in STEP7, according to the constraint condition composed of the restrictive condition set in STEP6 and the variable range of the displacement amount (the rotational angle) of each joint, the joint control unit 52 carries out optimization processing of searching for the desired displacement amount (the desired displacement amount to be reached) of each joint which satisfies the requirement that the magnitude of the load on each joint remains to be the threshold value or less (hereinafter referred to as "the optimum robot attitude search processing").

The variable range of the displacement amount of each joint is the range defined by a permissible upper limit value and a permissible lower limit value of the displacement amount, which are established in advance.

The optimum robot attitude search processing is the processing of determining a combination of the desired displacement amounts of the joints that satisfies the foregoing constraint conditions and the requirement by searching for a combination of the desired displacement amounts of the joints of the robot 1 that provides the predetermined evaluation function of a minimal value.

More specifically, the optimum robot attitude search processing repeats the processing of provisionally setting the desired displacement amount of each joint of the robot 1 within a range that satisfies the desired position of the center of gravity, the desired position of each contact portion, and the variable range of the displacement amount of each joint, the processing of calculating the load on each joint by dynamic calculation, which uses a geometric link model of the robot 1 (a model in which masses are set for the element links of the robot 1), from the provisionally set value of the desired displacement amount and the desired value of the contact reaction force of each contact portion, the processing of calculating the value of the evaluation function by using the calculated value of the load, and the processing of setting an updated amount of the desired displacement amount of each joint so as to bring the value of the evaluation function close to a minimal value or a value in the vicinity thereof.

In this case, according to the present embodiment, the desired displacement amount of each joint of the neck joint mechanism section 31 and the desired displacement amount of each joint of the hands 23 are maintained at the current actual displacement amounts. Hence, the updated amounts of the desired displacement amounts are zero. In other words, the desired displacement amounts to be updated are the desired displacement amounts of the joints of the joint mechanism section 8 of the base body 2 and the desired displacement amounts of the joints of the leg links 3 and the arm links 4.

Then, the combination of the provisionally set values of the desired displacement amounts of the joints, which is obtained when it is determined that the value of the evaluation function has reached the minimal value or a value in the vicinity thereof (e.g. when the value of the evaluation function has reached a predetermined value or less, or when the value of the evaluation function has converged to a substantially constant value, or when the number of the repetitions of the foregoing processing has reached a predetermined number), is determined as the desired displacement amount, i.e. the result of the search.

More specifically, as an example of the evaluation function described above, an evaluation function Cost[i] (the function illustrated in the graph of FIG. 4) defined according to expressions (1a) and (1b) given below for each joint (each joint for which the desired displacement amount is to be updated) of the robot 1 may be used. Incidentally, [i] denotes an identification character for discriminating each joint for which the desired displacement amount is to be updated. Hereinafter, the joint corresponding to the identification character [i] will be referred to as "the joint i."

Figure 4:
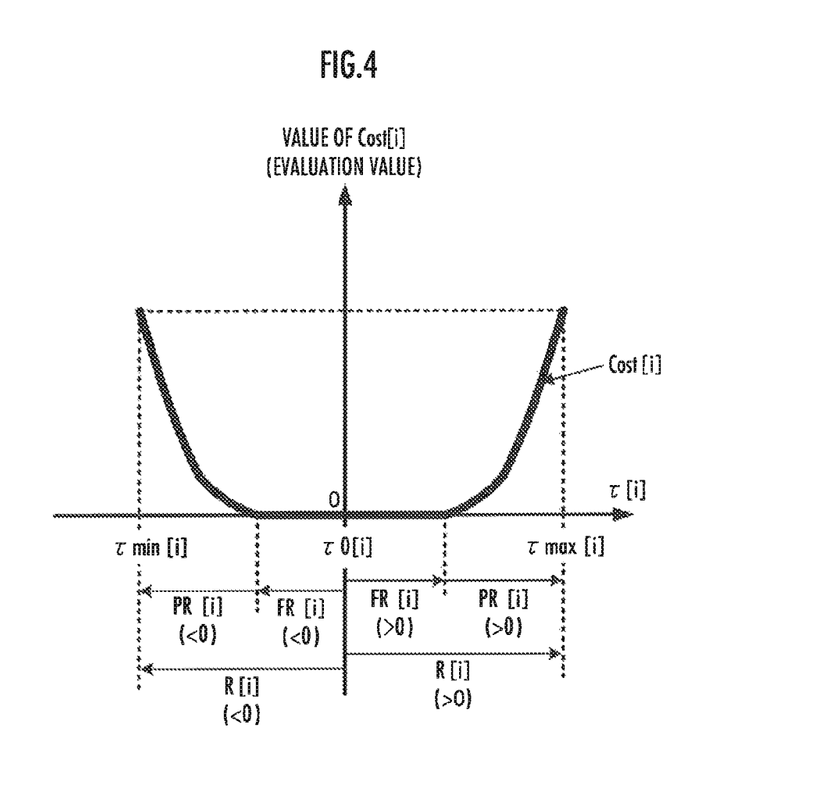
FIG. 4 is a graph illustrating the examples of evaluation functions used for the processing in STEP7 of FIG. 3.

In the case where $|\tau[i]-\tau 0[i]| \le |FR[i]|$ $$Cost[i]=0 \quad (1a)$$

In the case where $|\tau[i]-\tau 0[i]| > |FR[i]|$ $$Cost[i]=0.5 \times W[i] \times (((\tau[i]-\tau 0[i])-FR[i])/PR[i])^2 \quad (1b)$$

where $\tau[i]$ denotes the load (torque) on the joint i; $\tau 0[i]$ denotes an optimum reference value within the permissible range of the load on the joint i; and W[i] denotes the set value of the weight coefficient of the evaluation function corresponding to the joint i.

Further, FR[i] and PR[i] denote parameters set according to expressions (3) and (4) given below on the basis of the value of the parameter R[i] defined by expressions (2a) and (2b) given below.

In the case where $\tau[i] > \tau 0[i]$ $$R[i]=\tau max[i]-\tau 0[i] \quad (2a)$$

In the case where $\tau[i] \le \tau 0[i]$ $$R[i]=\tau min[i]-\tau 0[i] \quad (2b)$$

$$FR[i]=\alpha \times R[i] \quad (3)$$

$$PR[i]=R[i]-FR[i]=(1-\alpha) \times R[i] \quad (4)$$

where $\tau max[i]$ denotes the set value of the upper limit value of the permissible range of the load on the joint i, and $\tau min[i]$ denotes the set value of the lower limit value of the permissible range of the load on the joint i, and $\alpha$ denotes the set value of the ratio of the magnitude of FR[i] relative to the magnitude of R[i] (a constant value between 0 and 1).

The values of $\tau 0[i]$ and $\alpha$ are set in advance on the basis of experiments or the like to prevent the temperature of the joint actuator 41 corresponding to the joint i from becoming excessively high (exceeding a permissible upper limit temperature) in the case where the load $\tau[i]$ of the joint i is a load of a magnitude that satisfies the condition of $|\tau[i]-\tau 0[i]| \le FR[i]$.

According to the present embodiment, the desired displacement amount of each joint i is determined by a publicly known search processing technique such that the value of the evaluation function Cost[i] of each joint i for which the desired displacement amount is to be updated will be equal to or less than a predetermined threshold value (a value close to zero), which is set in advance for the joint i. In this case, the threshold value of the evaluation function Cost[i] of each joint i is set such that the load $\tau[i]$ of the joint i at which the value of Cost[i] becomes equal to or less than the threshold value will have a magnitude equal to or less than the threshold value in the determination processing in the foregoing STEP4.

As the search processing technique, a technique using a gradient Grad[i] of the evaluation function Cost[i] (represented by expression (5) given below), e.g. the gradient descent method, may be used.

$$Grad[i]=W[i] \times ((\tau[i]-\tau 0[i])-FR[i])/PR[i]^2 \quad (5)$$

As the search processing technique, any other technique, such as the steepest descent method or the Newton method, may be adopted.

Supplementarily, the desired displacement amount of each joint i may alternatively be determined such that the total sum (total value) of the values of the evaluation functions Cost[i] of the joints i for which the desired displacement amounts are to be updated becomes a predetermined threshold value or less. Further alternatively, the desired displacement amount of each joint i may be determined such that the total sum (the total value) of the values of the evaluation functions Cost[i] of the joints i for which the desired displacement amounts are to be updated becomes the predetermined threshold value or less and the evaluation function Cost[i] of each joint i becomes the predetermined threshold value or less.

Further, if the contact portions in the standby mode are some of the distal end portions of the leg links 3, 3 and the distal end portions of the arm links 4, 4 (e.g. if only the distal end portions of the leg links 3, 3 are the contact portions), then the desired displacement amounts of the joints of the movable links that are not the contact portions (the leg links 3 or the arm links 4) may be set to be constant.

The optimum robot attitude search processing in STEP7 described above searches for a combination of the desired displacement amounts of the joints that satisfies the requirement that the magnitude of the load on each joint remains to be the threshold value or less (hereinafter referred to as "the optimum displacement amount for load reduction") under the constraint condition composed of the restrictive condition set in STEP6 and the variable range of the displacement amount (rotational angle) of each joint.

Then, the joint control unit 52 of the controller 40 determines in STEP8 the trajectory of the displacement amount (the desired displacement amount for each control processing cycle) to accomplish the transition of the displacement amount of each joint of the robot 1 from the current displacement amount to the optimum displacement amount for load reduction determined in STEP7.

Figure 5:
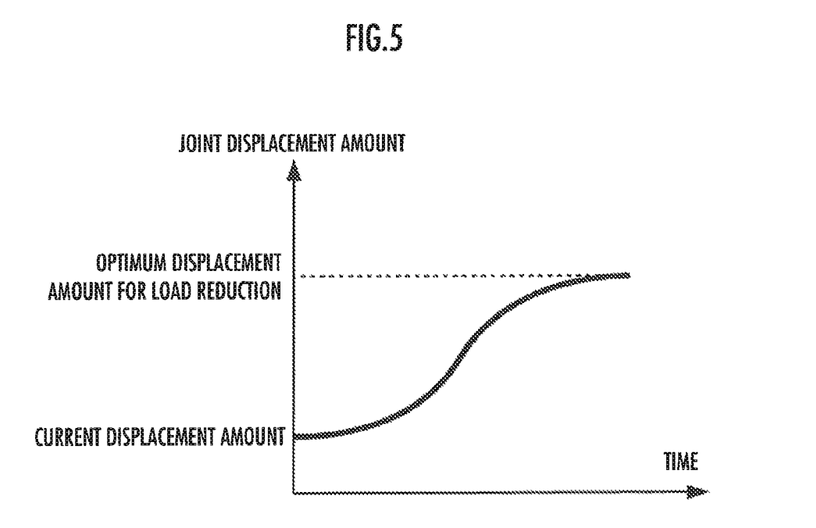
FIG. 5 is a graph illustrating an example of the transition mode of the displacement amount of a joint in the processing in STEP9 in FIG. 3.

In this case, in order to achieve smooth transition of the displacement amount of each joint, the trajectory of the displacement amount of each joint is determined such that the displacement acceleration (the angular acceleration) of each joint continuously changes as illustrated in, for example, the graph of FIG. 5.

In this case, the trajectory of the displacement amount of the joint is determined such that the magnitude of the displacement velocity (the temporal change rate of the displacement amount) of each joint in a period immediately after a start of the transition of the displacement amount of each joint and in a period immediately before an end thereof is smaller than that in a period between the period immediately after the start and the period immediately before the end.

Subsequently, in STEP9, the joint control unit 52 controls the joint actuators 41 to change the actual displacement amount of each joint according to the trajectory determined in STEP8.

Thus, the displacement amount of each joint of the robot 1 is changed to the optimum displacement amount for load reduction determined by the optimum robot attitude search processing in STEP7. As a result, the load on each joint of the robot 1 remains to be the threshold value or less. This prevents the temperatures of the joint actuators 41 for driving the joints from excessively increasing, thus allowing the standby mode of the robot 1 to continue.

Figure 6C:
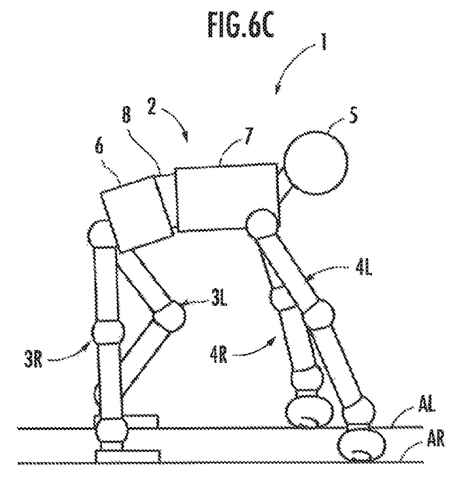
FIG. 6C and FIG. 6D are diagrams illustrating the states of the mobile robot defined by the desired displacement amount of each joint determined in the states illustrated in FIG. 6A and FIG. 6B.
Figure 6D:
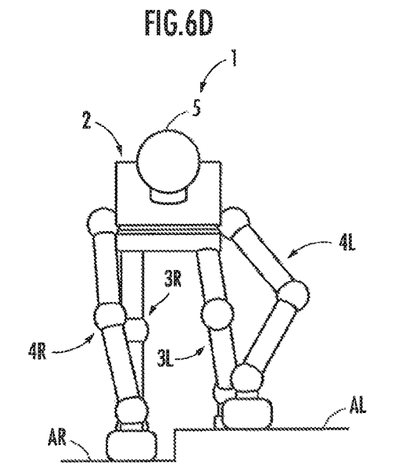

Carrying out the control processing in STEP6 to STEP9 in the situation illustrated in, for example, FIG. 6A and FIG. 6B, causes the entire attitude of the robot 1 to be changed to the attitude illustrated in FIG. 6C and FIG. 6D. In this case, the overall center of gravity of the robot 1 does not slant excessively to the right or the left of the robot 1, thus preventing the load on the joints of the leg links 3 and the arm links 4 from becoming excessively high.

Figure 7B:
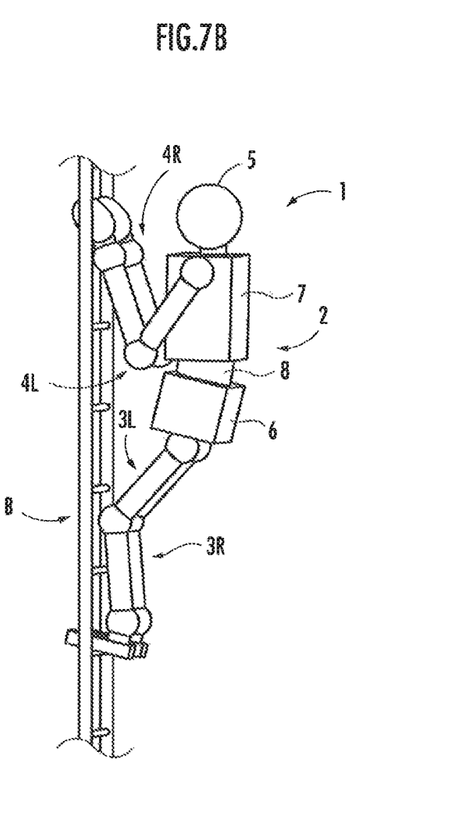
FIG. 7B is a diagram illustrating the state of the mobile robot defined by the desired displacement amount of each joint determined in the state illustrated in FIG. 7A.

Further, carrying out the control processing in STEP6 to STEP9 in the situation illustrated in, for example, FIG. 7A, causes the entire attitude of the robot 1 to be changed to the attitude illustrated in FIG. 7B by. In this case, the position of the overall center of gravity of the robot 1 in the horizontal direction further approaches right above the feet 13 (the contact portions) of the leg links 3, 3. In addition, the leg links 3, 3 further stretch. This prevents the load on the joints of the leg links 3 and the arm links 4 from becoming excessively high.

As described above, the present embodiment makes it possible to prevent the occurrence of the state in which the magnitude of the load of any one joint that exceeds the threshold value is maintained while the robot 1 is in the standby mode. This in turn prevents the temperature of any one of the joint actuators 41 from excessively rising. As a result, the joint actuators 41 can be protected from deterioration in the capabilities thereof or from damage.

The description will now be given of some modifications associated with the embodiment described above.

In the foregoing embodiment, the driving forces (torques) of the joint actuators 41 for driving the joints have been detected as the loads on the joints. Alternatively, however, the power consumed (the energy consumed per unit time) by each of the joint actuators 41, for example, may be detected as the load on a corresponding joint.

Further, in the embodiment, the magnitude of a detected load has been used as the load evaluation amount to determine whether the magnitude of the load exceeds a predetermined threshold value. However, for example, the estimated temperature value of the joint actuator 41 in a predetermined time may be obtained on the basis of the detection value of a load and the estimated temperature value may be used as the load evaluation amount.

In this case, the estimated temperature value can be obtained using, for example, a temperature rise estimation model (mathematical formula model) created in advance on the basis of experiments or the like.

As an example, an estimated temperature value T of each of the joint actuators 41 in a predetermined time t can be obtained according to expression (6) given below.

$$T = f \times t + T0 \quad (6)$$

where f denotes a coefficient value variably set according to the detection value of a load on the joint corresponding to the joint actuator 41; and T0 denotes the detection value of a current temperature of the joint actuator 41 obtained by an appropriate temperature sensor or the estimated value of the current temperature of the joint actuator 41 based on an appropriate temperature estimation model.

It is also possible to determine whether the estimated temperature value of the joint actuator 41 in the predetermined time exceeds a predetermined threshold value according to a map prepared in advance on the basis of, for example, the detection value (or the estimated value) of the current temperature of the joint actuator 41 and the detection value (the current value) of the load corresponding to the joint actuator 41.

Further, according to the embodiment described above, as the restrictive conditions, the desired position of the center of gravity of the robot 1 and the desired value of the contact reaction force (the translational force and the torque) acting on each contact portion have been set in addition to the desired position of a contact portion to be brought into contact with an external object, such as a ground surface, to support the weight of the robot 1. However, instead of the desired position of the center of gravity of the robot 1, the permissible range of the position of the overall center of gravity of the robot 1 may be set. Alternatively, the permissible range of the contact reaction force may be set instead of the desired value of the contact reaction force (the translational force and the torque) acting on each contact portion. Further, these permissible ranges may be used as the constraint conditions in determining the optimum displacement amount for load reduction of each joint.

In the embodiment described above, the optimum displacement amount for load reduction of each joint may be determined such that the load evaluation amount and the total power consumption remain to be the predetermined threshold values or less in the case where, for example, the total power consumption of all the joint actuators 41 exceeds a predetermined threshold value, in addition to the case where the determination result in the foregoing STEP4 is affirmative.

Further, when determining the optimum displacement amount for load reduction of each joint in the foregoing STEP7, another constraint condition may be added to avoid the interference among the movable links of the robot 1 or the interference between a surrounding external object and the robot 1.

Alternatively, when determining the trajectory for the transition of the displacement amount of each joint to the optimum displacement amount for load reduction in the foregoing STEP8, the trajectory for avoiding the interference among the movable links of the robot 1 or the interference between a surrounding external object and the robot 1 may be determined by search processing.

Further, the time required for the transition of the displacement amount of each joint to the optimum displacement amount for load reduction may be variably set according to, for example, the change amount of the displacement amount of each joint in the transition.

Further, in the embodiment described above, the processing from STEP6 to STEP9 has been carried out in the standby mode in which the entire motion of the robot 1 is at a halt. Alternatively, however, the processing from STEP6 to STEP9 may be carried out in a state in which the movable links except for the movable links subjected to the contact reaction force against the gravitational force acting on the robot 1 are in motion. For example, the processing from STEP6 to STEP9 may be carried out if the determination result in STEP4 is affirmative in a state in which the distal end portions of the two leg links 3, 3 are landed to halt the motions of the leg links 3, 3 while the head 5 and/or the arm link or links 4 are in motion.

Further, in the processing of determining the optimum displacement amount for load reduction of each joint (the processing in STEP7), the portion or portions of the robot 1 brought in contact with an external object may be changed or the number thereof may be increased. For example, if it is known that there is a wall near the base body 2 of the robot 1, then the optimum displacement amount for load reduction of each joint may be determined such that the base body 2 is brought in contact with and leaned against the wall, i.e.

such that the contact reaction force against the gravitational force acting on the robot 1 is generated.

Further, in the embodiment described above, the processing from STEP6 to STEP9 has been carried out by the controller 40 installed in the robot 1. Alternatively, however, a part of the processing (e.g. the processing from STEP6 to STEP8) may be carried out by a server located outside the robot 1.

What is claimed is:

1. A control device for a mobile robot having a base body, a plurality of joints, a movable link connected to the base body such that the movable link moves with respect to the base body by a motion of one or more joints among the plurality of the joints, and a joint actuator that drives each of the joints, the control device comprising at least one processor and a memory, the memory having stored thereon a program which, when executed by the at least one processor, causes the control device to function as a plurality of units, comprising:

a joint load detecting unit that detects a load on each joint of the mobile robot; and a joint control unit which discriminates whether a load evaluation amount exceeds a predetermined threshold value in a predetermined motion state of the mobile robot, and, when the joint control unit discriminates that the load evaluation amount exceeds the predetermined threshold value in the predetermined motion state of the mobile robot, determines a desired displacement amount of each joint of the mobile robot that satisfies a requirement that the load evaluation amount remains the predetermined threshold value or less, and the joint control unit controls the joint actuator for driving each joint of the mobile robot based on the desired displacement amount, wherein the load evaluation amount is either a magnitude of the load detected on a particular joint of the mobile robot by the joint load detecting unit or an estimated temperature value of the joint actuator for driving the particular joint in a predetermined time obtained based on the magnitude of the load detected on the particular joint of the mobile robot by the joint load detecting unit, and wherein the predetermined motion state is a motion state including a motion according to a motion command.

2. The control device for the mobile robot according to claim 1, wherein the mobile robot has a plurality of movable links, which include the movable link, connected to the base body such that each of the plurality of movable links moves with respect to the base body by the motion of one or more joints among the plurality of the joints driven by the joint actuator, and wherein the predetermined motion state is a state in which the motion of at least a contact movable link, which is at least one of the plurality of movable links which is brought into contact with an external object to be subjected to a contact reaction force against a gravitational force acting on the mobile robot, is at a halt.

3. The control device for the mobile robot according to claim 2, wherein the joint control unit is configured to determine, as the desired displacement amount of each joint of the mobile robot, the desired displacement amount which can be attained while holding the contact movable link in contact with the external object and which makes it possible to satisfy the requirement in the state in which the motion of the contact movable link is at a halt at the desired displacement amount, and to control the joint actuator for driving each joint so as to change an actual displacement amount of each joint of the mobile robot to the determined desired displacement amount.

4. The control device for the mobile robot according to claim 1, wherein the joint control unit is configured to determine the desired displacement amount of each joint of the mobile robot which makes it possible to satisfy the requirement under a constraint condition related to a position of a contact portion to be brought in contact with an external object during the predetermined motion state among individual portions of the mobile robot, a contact reaction force acting on the contact portion, and a position of the center of gravity of the mobile robot.

5. The control device for the mobile robot according to claim 4, wherein the constraint condition related to the position of the contact portion is a constraint condition that restricts a desired position of the contact portion to an actual position of the contact portion, the constraint condition related to the contact reaction force is a constraint condition that restricts a moment acting on the mobile robot due to the contact reaction force, and the constraint condition related to the position of the center of gravity is a constraint condition that restricts a positional relationship between the position of the center of gravity and the contact portion.

6. The control device for the mobile robot according to claim 1, wherein the joint control unit is configured to control the joint actuator for driving each joint such that, in the case where an actual displacement amount of each joint of the mobile robot is changed to the determined desired displacement amount, a magnitude of a temporal change rate of the displacement amount of each joint in a period immediately after a start of a transition and a period immediately before an end thereof is smaller than that in a period between the period immediately after the start of the transition and the period immediately before the end thereof.

* * * * *